(12) United States Patent
Lehmann et al.

(10) Patent No.: US 10,386,855 B2
(45) Date of Patent: Aug. 20, 2019

(54) METHOD AND DEVICE FOR THE DECENTRALIZED COORDINATION OF DRIVING MANEUVERS

(71) Applicants: VOLKSWAGEN AKTIENGESELLSCHAFT, Wolfsburg (DE); AUDI AG, Ingolstadt (DE)

(72) Inventors: Bernd Lehmann, Wolfsburg (DE); Sandra Kleinau, Rötgesbüttel (DE); Jan-Niklas Meier, Wolfsburg (DE); Bernd Rech, Bokensdorf (DE); Teodor Buburuzan, Braunschweig (DE); Stefan Gläser, Braunschweig (DE); Hendrik-Jörn Günther, Hannover (DE); Monique Engel, Braunschweig (DE); Patrick Pascheka, The Hauge (NL)

(73) Assignees: VOLKSWAGEN AKTIENGESELLSCHAFT, Wolfsburg (DE); AUDI AG, Ingolstadt (DE)

( * ) Notice: Subject to any disclaimer, the term of this patent is extended or adjusted under 35 U.S.C. 154(b) by 0 days.

(21) Appl. No.: 15/773,833

(22) PCT Filed: Oct. 12, 2016

(86) PCT No.: PCT/EP2016/074463
§ 371 (c)(1),
(2) Date: May 4, 2018

(87) PCT Pub. No.: WO2017/076593
PCT Pub. Date: May 11, 2017

(65) Prior Publication Data
US 2018/0321689 A1 Nov. 8, 2018

(30) Foreign Application Priority Data

Nov. 6, 2015 (DE) .................. 10 2015 221 817

(51) Int. Cl.
*B60W 30/00* (2006.01)
*G05D 1/02* (2006.01)
(Continued)

(52) U.S. Cl.
CPC .......... *G05D 1/0289* (2013.01); *B60W 30/00* (2013.01); *G05D 1/0212* (2013.01); *G08G 1/163* (2013.01);
(Continued)

(58) Field of Classification Search
CPC .... G05D 1/0289; G05D 1/0212; G05D 1/163; G05D 1/166; G05D 2201/0213;
(Continued)

(56) References Cited

U.S. PATENT DOCUMENTS 9,884,631 B2 * 2/2018 James ................. B60W 50/082
10,054,678 B2 * 8/2018 Mei .................... B60W 30/0956
(Continued)

FOREIGN PATENT DOCUMENTS

DE   102007058538 A1   6/2009
DE   102012011994 A1   12/2013
(Continued)

OTHER PUBLICATIONS

Bevly et al., Lane Change and Merge Maneuvers for Connected and Automated Vehicles: A Survey, 2016, IEEE, p. 105-120 (Year : 2016).*
(Continued)

*Primary Examiner* — Mcdieunel Marc
(74) *Attorney, Agent, or Firm* — Barnes & Thornburg LLP (57) ABSTRACT

A method for the decentralized coordination of driving maneuvers of at least two motorized transportation vehicles.

(Continued)

A planned trajectory and a desired trajectory are transferred from a first motorized transportation vehicle to a second motorized transportation vehicle. In the second motorized transportation vehicle, a planned trajectory of the second motorized transportation vehicle is compared with the desired trajectory of the first motorized transportation vehicle. The planned trajectory of the second motorized transportation vehicle is adapted in response to satisfaction of adaptation criterion. The planned and desired trajectories of the first motorized transportation vehicle are combined with a strategic trajectory of the first motorized transportation vehicle. The planned trajectory and a desired trajectory of the second motorized transportation vehicle are combined with a strategic trajectory of the second motorized transportation vehicle. The planned trajectories of the first and second motorized transportation vehicles are collision-free with respect to one another.

10 Claims, 4 Drawing Sheets

(51) Int. Cl.
　　*G08G 1/16*　　　(2006.01)
　　*H04W 4/46*　　　(2018.01)
(52) U.S. Cl.
　　CPC .............. *G08G 1/166* (2013.01); *H04W 4/46* (2018.02); *G05D 2201/0213* (2013.01)
(58) Field of Classification Search
　　CPC ...... B60W 30/00; B60W 30/18; B60W 50/14; B60W 30/18163; B60W 2050/146; B60W 30/0956; B60W 50/082; H04W 4/46; G08G 1/096741; G08G 1/0962; H04L 67/12; B62D 15/0255; G06N 5/04
　　See application file for complete search history.

(56) References Cited

U.S. PATENT DOCUMENTS

| | | | |
|---|---|---|---|
| 10,239,527 B2* | 3/2019 | Hada | G06N 5/04 |
| 2016/0358479 A1* | 12/2016 | Riedelsheimer | H04L 67/12 |
| 2018/0292829 A1* | 10/2018 | Li | G05D 1/0212 |
| 2018/0319400 A1* | 11/2018 | Kleinau | H04W 4/46 |
| 2018/0319403 A1* | 11/2018 | Buburuzan | B62D 15/0255 |
| 2018/0322782 A1* | 11/2018 | Engel | G08G 1/096741 |
| 2019/0103023 A1* | 4/2019 | McNew | G08G 1/0962 |

FOREIGN PATENT DOCUMENTS

| | | |
|---|---|---|
| DE | 102012021282 A1 | 4/2014 |
| DE | 102013214225 A1 | 1/2015 |
| DE | 102013223428 A1 | 5/2015 |

OTHER PUBLICATIONS

Balghiasefi et al., Automatic fault detection and execution monitoring in cooperative maneuvering, 2015, IEEE, p. 37-44 (Year: 2015).*
During et al., Cooperative Maneuver Planning for Cooperative Driving, 2016, IEEE, p. 8-22 (Year: 2016).*
Caveney et al., Cooperative driving: Beyond V2V as an ADAS sensor, 2012, IEEE, p. 529-534 (Year: 2012).*
Search Report for International Patent Application No. PCT/EP2016/074463; dated Dec. 7, 2016.

* cited by examiner

METHOD AND DEVICE FOR THE DECENTRALIZED COORDINATION OF DRIVING MANEUVERS

PRIORITY CLAIM

This patent application is a U.S. National Phase of International Patent Application No. PCT/EP2016/074463, filed 12 Oct. 2016, which claims priority to German Patent Application No. 10 2015 221 817.1, filed 6 Nov. 2015, the disclosures of which are incorporated herein by reference in their entireties.

SUMMARY

Illustrative embodiments relate to a method and a device for the decentralized coordination of driving maneuvers.

BRIEF DESCRIPTION OF THE DRAWINGS

The disclosed embodiments will be explained in more detail below with reference to the figures, of which.

DETAILED DESCRIPTION

Modern motorized transportation vehicles have a multiplicity of assistance systems which assist the driver when driving the transportation vehicle. In this context, semi-autonomous and autonomous systems which permit semi-automatic or fully automatic control of the motorized transportation vehicle are increasingly being used. In the case of fully automated driving, coordination is necessary between the motorized transportation vehicle and other motorized transportation vehicles in the surrounding area.

DE 10 2012 011 994 A1 discloses a method for the cooperative control of a traffic situation with at least two transportation vehicles which exchange information between at least two transportation vehicles by a Vehicle2Vehicle communication, wherein the exchanged information is used to influence the driving behavior of the transportation vehicles involved. In this context, a driving behavior which is intended by a first transportation vehicle is transmitted to a second transportation vehicle of the at least two transportation vehicles as information which is to be exchanged in addition to the current driving behavior and current driving information. On the basis of the information about the intended driving behavior, the second transportation vehicle adapts its driving behavior to the intended driving behavior of the first transportation vehicle.

The drawback of the abovementioned method is that the exchanged information is used to check only whether or not it is possible to adapt the driving behavior of a transportation vehicle. Other factors which could require coordinated automated driving by cooperative action are not taken into account.

Disclosed embodiments provide a method and a device in a motorized transportation vehicle for the decentralized coordination of driving maneuvers, in which coordination between the motorized transportation vehicles is improved.

A trajectory will be used below to denote a possible route. The trajectory is a mathematic description of a geographic distance. Any geographic point on this distance can be assigned a time which indicates when the motorized transportation vehicle can pass this point. If such a trajectory represents the planned maneuver of a transportation vehicle, it makes it possible to predict at which position this transportation vehicle will be located at a specific time.

A planned trajectory will denote below a trajectory which is precise in terms of a lane and which describes the currently planned driving maneuver.

A desired trajectory is a trajectory which is favored over the planned trajectory, for example, because it is more cost-effective or would lead to a shorter driving time. However, the desired trajectory cannot be traveled along for different reasons, because, for example, the trajectory would lead to a collision with other transportation vehicles. A desired trajectory must basically be capable of being driven along in terms of driving dynamics.

A strategic trajectory below will be a trajectory which does not have to be precise in terms of a lane but instead merely comprises the roads which are to be traveled along by a motorized transportation vehicle in the near future. The strategic trajectory indicates which strategic objective a motorized transportation vehicle pursues. The term strategic objective is used here to denote, for example, the intersection at which a motorized transportation vehicle would like to turn right or left. It does not comprise the entire route from a starting point to a destination point here. It is sufficient if the next secondary objective (turning, parking/stopping, . . . ) can be discerned on the basis of this trajectory.

A method for the decentralized coordination of driving maneuvers of at least two motorized transportation vehicles is made available, comprising the following operations: providing a planned trajectory and a desired trajectory by a maneuver planning device in a first motorized transportation vehicle, transferring the planned trajectory and the desired trajectory to at least a second motorized transportation vehicle in the surroundings via a maneuver coordination device of the first motorized transportation vehicle, wherein the maneuver coordination device communicates with the second motorized transportation vehicle via a Vehicle2Vehicle communication, receiving the planned trajectory and the desired trajectory of the first motorized transportation vehicle by a maneuver coordination device of the second motorized transportation vehicle, comparing the planned trajectory of the second motorized transportation vehicle with the received desired trajectory of the first motorized transportation vehicle in a maneuver planning device of the second motorized transportation vehicle, and, if at least one adaptation criterion is met, adapting the planned trajectory of the second motorized transportation vehicle by the maneuver planning device of the second motorized transportation vehicle to form an adapted planned trajectory, and wherein the planned and desired trajectories of the first motorized transportation vehicle can be combined with a strategic trajectory of the first motorized transportation vehicle, and the planned trajectory and a desired trajectory of the second motorized transportation vehicle can be combined with a strategic trajectory of the second motorized transportation vehicle, wherein the planned trajectories of the first and second motorized transportation vehicles are free of collisions with one another, and wherein the adaptation criterion is that the received desired trajectory of the first motorized transportation vehicle collides with the planned trajectory of the second motorized transportation vehicle, and a total cost function is optimized by the adaptation, wherein the total cost function comprises at least cost functions of the first and second motorized transportation vehicles.

In addition, a device is provided in a first motorized transportation vehicle for the decentralized coordination of driving maneuvers with at least a second motorized transportation vehicle, comprising a maneuver coordination device for coordinating driving maneuvers with the second motorized transportation vehicle in the area surrounding the first motorized transportation vehicle, wherein the maneuver coordination device is equipped with a Vehicle2Vehicle interface to communicate with the second motorized transportation vehicle, and a maneuver planning device for providing a planned trajectory and a desired trajectory of the first motorized transportation vehicle, wherein the maneuver coordination device is designed to transfer the provided planned trajectory and the provided desired trajectory of the first motorized transportation vehicle at least to the second motorized transportation vehicle, and to receive planned trajectories and desired trajectories which are transferred by the second motorized transportation vehicle, and wherein the maneuver planning device is designed, given the presence of an adaptation criterion, to adapt the planned trajectory of the first motorized transportation vehicle as a function of the received desired trajectory of the second motorized transportation vehicle to form an adapted planned trajectory, wherein the planned trajectories and desired trajectories of the first motorized transportation vehicle can be combined with a strategic trajectory of the first motorized transportation vehicle, wherein the planned trajectories of the first and second motorized transportation vehicles are free of collision with one another, and wherein the adaptation criterion is that the received desired trajectory of the second motorized transportation vehicle collides with the planned trajectory of the first motorized transportation vehicle, and a total cost function is optimized by the adaptation, wherein the total cost function comprises at least cost functions of the first and second motorized transportation vehicles.

Disclosed embodiments make available three different trajectories: a strategic trajectory, a planned trajectory and a desired trajectory. The planned trajectory and the desired trajectory always have to be capable of being combined with the strategic trajectory here. It is assumed that the motorized transportation vehicles always aim at a cooperative behavior. To coordinate driving maneuvers with one or more other motorized transportation vehicles in a cooperative state, a maneuver coordination device transfers the planned trajectory and the desired trajectory of the motorized transportation vehicle to the other motorized transportation vehicles in the surroundings. The latter check the received planned trajectories and desired trajectories to determine whether they collide with the transportation vehicle's own planned trajectory and whether adaptation of the transportation vehicle's own planned trajectory would be beneficial. If adaptation is beneficial, the planned trajectory is adapted and the driving behavior is correspondingly changed. The motorized transportation vehicle itself receives planned trajectories and desired trajectories of the other motorized transportation vehicles and also adapts its planned trajectory if it is necessary and beneficial to do so.

In the disclosed method, a complex evaluation of the possible adaptation of the driving behavior of the motorized transportation vehicle is possible. Such an evaluation over the total cost function optimizes the total traffic situation in interaction with the other motorized transportation vehicles in the surroundings of the motorized transportation vehicle. In this way, for example, both a traffic flow and costs and an environmental balance can be configured in an optimum way, since unnecessary driving maneuvers, such as, for example, braking and accelerating, can be avoided or minimized. This increases the comfort for the passengers and the costs and the expenditure of automated journeys are reduced.

Ensuring the freedom from collision of the planned trajectories means here specifically that the planned trajectories of the transportation vehicles are configured in such a way that the transportation vehicles are not in contact at any time. In this context, a tolerance range and/or a minimum distance can also be taken into account, for example, a safety distance of several meters which always has to be maintained between the motorized transportation vehicles.

In at least one disclosed embodiment there is provision that after the adaptation of the planned trajectory of the second motorized transportation vehicle, the adapted planned trajectory is transferred to the maneuver coordination device of the first motorized transportation vehicle by the maneuver coordination device of the second motorized transportation vehicle, and the planned trajectory of the first motorized transportation vehicle is replaced with the desired trajectory of the first motorized transportation vehicle by the maneuver planning device of the first motorized transportation vehicle. This permits rapid reaction of the first motorized transportation vehicle to the adapted driving behavior of the second motorized transportation vehicle.

In a further disclosed embodiment there is provision that the optimization of the total cost function comprises a comparison of costs for the execution of the planned trajectories of the first and second motorized transportation vehicles with costs for the execution of the desired trajectory of the first motorized transportation vehicle and for the execution of the adapted planned trajectory of the second motorized transportation vehicle. This permits a detailed estimation as to whether or not it is beneficial to adapt the planned trajectory of the second motorized transportation vehicle.

In at least one disclosed embodiment there is provision that the total cost function comprises a cost function of at least one further motorized transportation vehicle. In this way it is possible to evaluate a traffic situation which comprises more than only two motorized transportation vehicles. Taking into account the wider surroundings by including further motorized transportation vehicles in the evaluation therefore promotes the coordination of the total local traffic situation.

In a further disclosed embodiment there is provision that a normal behavior and at least one basic maneuver are carried out by the maneuver planning devices of the at least two motorized transportation vehicles to ensure the freedom from collision of the planned trajectories. Normal behavior means that the transportation vehicles stay in their lane and drive at a speed v. The speed v is dependent on a transportation vehicle-specific basis on various factors such as, e.g., the permitted maximum speed on the road being traveled on. The basic maneuver is necessary to be able to avoid collisions at all times. The basic maneuver is composed, for example, of braking to a stationary state, a behavior which is generally customary and established in road traffic to avoid collisions. The basic maneuver can always be applied here independently of other motorized transportation vehicles and their destinations as planned trajectories. Furthermore, the basic maneuver can comprise, for example, maintaining a predefined safety distance from the transportation vehicle in front. The normal behavior and the basic maneuver permit a traffic situation to be converted to a safe state at any time.

In at least one disclosed embodiment there is provision that the desired trajectories of the at least two motorized transportation vehicles have a prioritization, with the result that a ranking of the desired trajectories can be produced, wherein the ranking determines which of the desired trajectories is implemented. This is beneficial if there are a plurality of motorized transportation vehicles in the surroundings which all have a desired trajectory which partially or entirely overlap. By producing the ranking it is then possible to implement the desired trajectories, at least for some of the motorized transportation vehicles, and as a result to coordinate and optimize the local traffic situation. Prioritization can be carried out here, for example, according to a speed of the motorized transportation vehicles, according to a state of load or a weight of the motorized transportation vehicles (heavily laden, empty, etc.), a number of occupants, a type of motorized transportation vehicle (petrol, diesel, hybrid, electric, etc.) or according to other criteria, for example, urgency.

In a further disclosed embodiment there is provision that the desired trajectories of the at least two motorized transportation vehicles are free of collision. This means that the desired trajectories have to be configured free of collisions before implementation. This permits a simple way of implementing all the desired trajectories.

In at least one disclosed embodiment there is provision that the planned trajectory and the desired trajectory of the first motorized transportation vehicle are transferred by the maneuver coordination device only to other motorized transportation vehicles in a predefined area surrounding the first motorized transportation vehicle. The surrounding area is limited here, for example, to a circle of 50 m around the motorized transportation vehicle. This permits efficient implementation of the method, since the expenditure on communication and computing is minimized. The circle around the transportation vehicle can, however, also become smaller or larger depending on the traffic situation and the speed of the motorized transportation vehicle. Therefore, for example, a relatively small circle is expedient in a traffic jam situation, and a relatively large circle is expedient on a freely moving freeway.

At least one disclosed embodiment provides that the maneuver coordination device produces an estimation of the planned trajectory of the other motorized transportation vehicle for another motorized transportation vehicle for which no planned trajectory and/or desired trajectory are available. This permits other motorized transportation vehicles which are being driven, for example, in a non-automated state or do not transfer any planned trajectories or desired trajectories for other reasons, also to be included in the coordination of the driving maneuvers. By the estimation of the planned trajectory it is then possible, for example, to avoid from the outset a situation in which a desired trajectory is provided with which a collision occurs with the estimated planned trajectory of the other motorized transportation vehicle.

In a further disclosed embodiment there is provision that the planned trajectory and the desired trajectory of the first motorized transportation vehicle are transferred to the second motorized transportation vehicle and/or to another motorized transportation vehicle by the maneuver coordination device at regular time intervals and/or when the planned trajectory and/or desired trajectory is changed. This has the benefit that other motorized transportation vehicles in the area surrounding the motorized transportation vehicle are always informed about the planned trajectory and the desired trajectory of the motorized transportation vehicle. If other motorized transportation vehicles enter the area surrounding the motorized transportation vehicle, they likewise receive the planned trajectories and desired trajectories. If, on the other hand, the planned trajectory and the desired trajectory of the motorized transportation vehicle change, the planned trajectory and the desired trajectory are transferred immediately so that the other motorized transportation vehicles are informed of them immediately. It therefore becomes possible to evaluate and coordinate the traffic situation continuously on the basis of the current planned trajectories and desired trajectories.

Parts of the device and/or of the functions of the device can also be embodied as a combination of hardware and software, for example, as a microcontroller or microprocessor on which a corresponding program code is executed.

Figure 1:
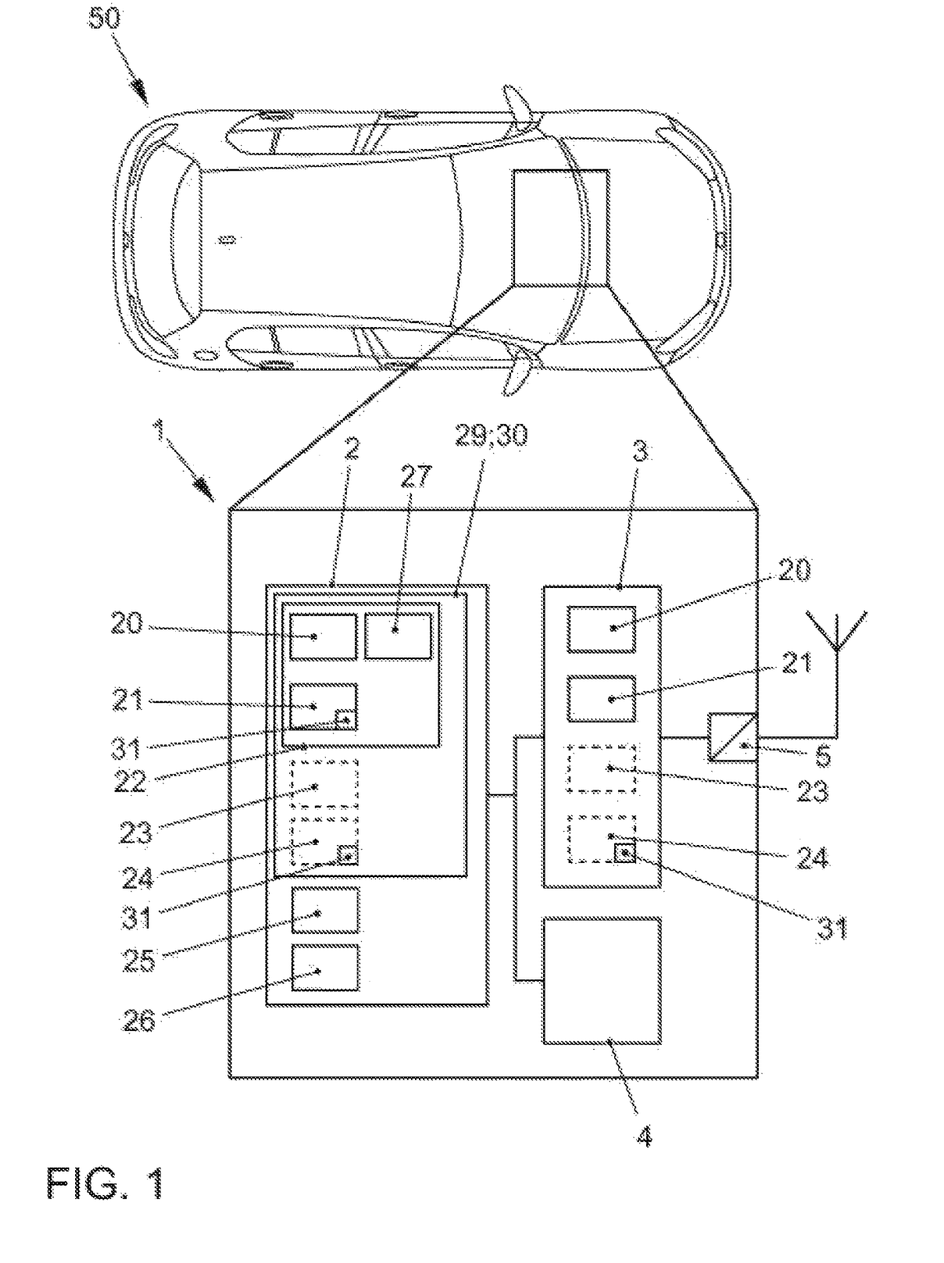
FIG. 1 shows a schematic illustration of an exemplary embodiment of a device for the decentralized coordination of driving maneuvers.

FIG. 1 shows a schematic illustration of an embodiment of a device 1 in a motorized transportation vehicle 50 for the decentralized coordination of driving maneuvers of at least two motorized transportation vehicles. The device 1 comprises a maneuver planning device 2 and a maneuver coordination device 3. The device 1 can comprise a controller 4, wherein the controller 4 serves, for example, to control the maneuver planning device 2 and the maneuver coordination device 3 or for controlling automated driving. The device 1 also comprises a Vehicle2Vehicle interface 5 via which the maneuver coordination device 3 can communicate with other motorized transportation vehicles in the area surrounding the motorized transportation vehicle 50.

The maneuver planning device 2 continuously plans a planned trajectory 20 and a desired trajectory 21 of the motorized transportation vehicle 50. In this context, the planned trajectory 20 and the desired trajectory 21 can also be identical, for example, if a favored trajectory has already been traveled along by the planned trajectory 20. The planned trajectory 20 and the desired trajectory 21 are planned here in such a way that they can be combined with a strategic trajectory 21 of the motorized transportation vehicle 50.

The planned trajectory 20 and the desired trajectory 21 are transferred by the maneuver planning device 2 to the maneuver coordination device 3 which transfers the planned trajectory 20 and the desired trajectory 21 to at least one other transportation vehicle in the area surrounding the motorized transportation vehicle 50 via the Car2Car interface 5. In addition, the maneuver coordination device 3 can receive a planned trajectory 23 and a desired trajectory 24 of another motorized transportation vehicle. In general, the maneuver coordination device 3 keeps the trajectories of other motorized transportation vehicles available here until more current trajectories are received. The received planned trajectory 23 and the received desired trajectory 24 of the other motorized transportation vehicle are passed on from the maneuver coordination device 3 to the maneuver planning device 2, which includes the planned trajectory 23 and the desired trajectory 24 of the other motorized transportation vehicle in the planning of the planned trajectory 20 of the motorized transportation vehicle in question and the desired trajectory 21 of the motorized transportation vehicle 50. For this purpose, it is firstly checked by the maneuver planning device 2 whether the planned trajectory 23 of the other motorized transportation vehicle with the planned trajectory 20 of the motorized transportation vehicle 50 are free of collision. If the planned trajectories 20, 23 collide, a basic maneuver 25 is carried out, wherein the planned trajectory 20 is adapted in such a way that the motorized transportation vehicle 50 either comes to a standstill as quickly as possible by braking, or in such a way that a collision is avoided. If the planned trajectories 20, 23 do not collide, the maneuver planning device 2 checks whether an adaptation criterion 29 is met. For this purpose it is checked whether the desired trajectory 24 which is received by the other motorized transportation vehicle collides with the planned trajectory 20 of the motorized transportation vehicle 50. If this is not the case, the planned trajectory 20 is retained. If, on the other hand, the desired trajectory 24 of the other motorized transportation vehicle collides with the planned trajectory 20 of the motorized transportation vehicle 50, the maneuver planning device 2 checks whether adaptation of the planned trajectory 20 is beneficial. For this purpose it evaluates a total cost function 30. During the evaluation, the costs of carrying out the planned trajectories 20, 23 are compared with carrying out an adapted planned trajectory 27 of the motorized transportation vehicle 50 and the desired trajectory 24 of the other motorized transportation vehicle. If adaptation is beneficial, the adaptation criterion 29 is met and the planned trajectory 20 is adapted, that is to say the planned trajectory 20 is replaced by the adapted planned trajectory 27. If adaptation is not beneficial, the adaptation criterion 29 is not met, and the planned trajectory 20 is not replaced by the adapted planned trajectory 27.

The adapted trajectory 27 is subsequently passed on to the maneuver coordination device 3 which transfers the adapted planned trajectory 27 to the other motorized transportation vehicle via the Vehicle2Vehicle interface. The other motorized transportation vehicle can then replace its planned trajectory 23 with its desired trajectory 24.

In addition, as well as the planned trajectories 20, 27 and desired trajectory 21, other information, for example, prioritization 31 with respect to the desired trajectory 21, can be transferred by the maneuver coordination device 3. The prioritization 31 permits the production of a ranking of the desired trajectories when a plurality of colliding desired trajectories of a plurality of other motorized transportation vehicles are present in the area surrounding the motorized transportation vehicle 50.

FIGS. 2 to 5 show schematically various traffic situations 60 for explaining the problems during the coordination of driving maneuvers of a plurality of motorized transportation vehicles. The same reference symbols denote the same objects here.

Figure 2:
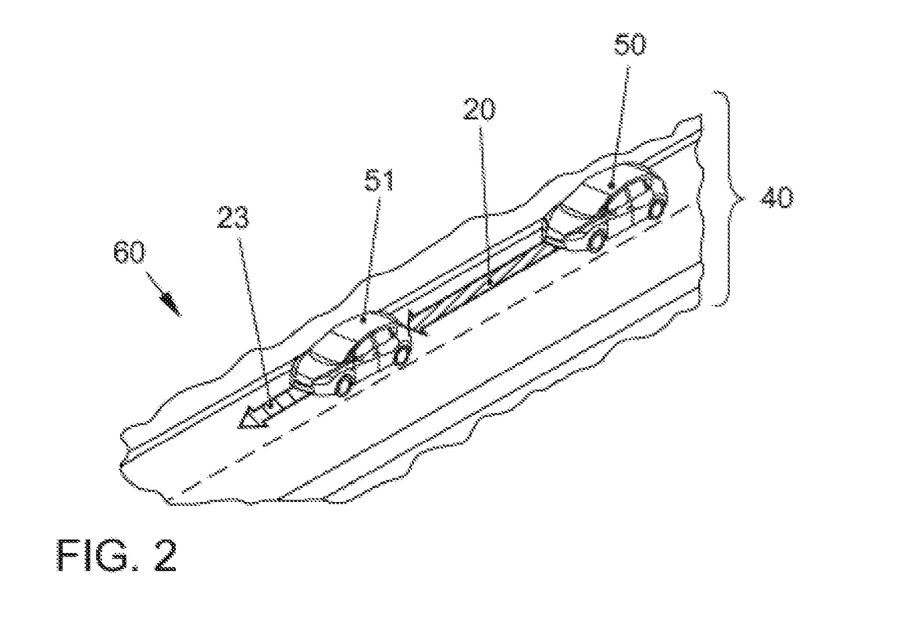
FIG. 2 shows a schematic illustration of a traffic situation explaining the problems which occur during the coordination of driving maneuvers.

FIG. 2 shows here a typical traffic situation 60 on a road 40 with two lanes. In this context, in front of a motorized transportation vehicle 50 there is another motorized transportation vehicle 51. Both motorized transportation vehicles 50, 51 basically assume a normal behavior 25 here at all times and can carry out at least one basic maneuver 26 at any time. The planned trajectory 23 of the other motorized transportation vehicle 51 and the planned trajectory 20 of the motorized transportation vehicle 50 are illustrated schematically as vectors in front of the motorized transportation vehicles 50, 51. The planned trajectories 20, 23 are emitted at regular intervals by a disclosed device in each case, so that the driving maneuvers of the two motorized transportation vehicles 50, 51 can be cooperatively coordinated.

For the sake of clarification, in this example the planned trajectory 20 of the motorized transportation vehicle 50 collides with the planned trajectory 23 of the other motorized transportation vehicle 51. This is detected by the maneuver planning device, and the motorized transportation vehicle 50 can carry out the basic maneuver to avoid a collision, that is to say the motorized transportation vehicle 50 brakes to a standstill to enter a safe state. However, this state has the drawback that as a result road users do not reach their destinations, or reach them more slowly.

The other motorized transportation vehicle 51 is too slow for the motorized transportation vehicle 50, for which reason it would be more beneficial for the motorized transportation vehicle 50 in this situation if it were to overtake the other motorized transportation vehicle 51.

Figure 3:
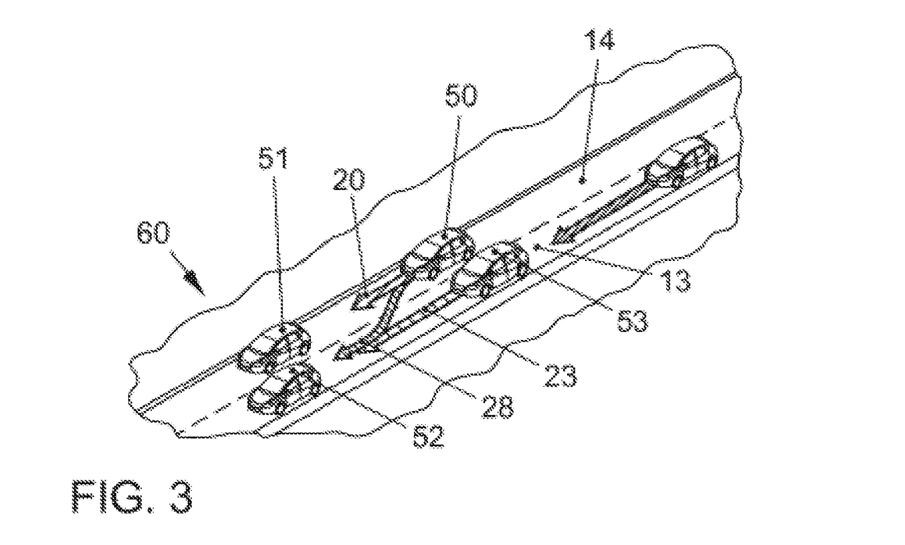
FIG. 3 shows a schematic illustration of a traffic situation explaining the problems which occur during the coordination of driving maneuvers.

This case is depicted in FIG. 3, wherein the traffic situation 60 has been expanded somewhat. In the traffic situation 60 shown, the lane of the motorized transportation vehicle 50 is blocked by another motorized transportation vehicle 51. On the overtaking lane 13, the traffic is very dense owing to other motorized transportation vehicles 52, 53, with the result that there is no sufficiently large gap for the motorized transportation vehicle 50 to change from the lane 14 onto the overtaking lane 13. The normal behavior does not permit the trajectory 28 to be planned and output owing to the freedom from collision of the planned trajectories 23, 20. The trajectory 28 would collide with the planned trajectory 23 of the other motorized transportation vehicle 53. This leads to a situation in which the motorized transportation vehicle 50 can only carry out the basic maneuver 26 in this traffic situation 60. The motorized transportation vehicle 50 has to brake and stop and can therefore not achieve its own objectives, or only more slowly.

There must therefore be a possible way of bringing about a targeted collision of the trajectories. For this purpose, a collision with the planned trajectory 23 could be intentionally brought about by the trajectory 28. Assuming that the other motorized transportation vehicles 51, 52, 53 behave normally, the other motorized transportation vehicle 53 would detect the collision and adapt its planned trajectory 23 in such a way that the collision does not take place. To do this, it would brake. However, this procedure has two drawbacks. Firstly, a driving maneuver is forced on the other motorized transportation vehicle 53, and the other motorized transportation vehicle 53 does not have an option of refusing, since it must comply with the normal behavior. Therefore, such a solution would not be a cooperative driving maneuver. Secondly, the trajectory 28 would no longer be unambiguous. A trajectory is actually information for other motorized transportation vehicles 51, 52, 53 with which they can predict the future driving maneuvers of the motorized transportation vehicle 50. If this trajectory 28 is then used to bring about a collision in a targeted state, a plan, which perhaps cannot be carried out at all, is shown to the outside. In this case, the motorized transportation vehicle 50 would be dependent on whether the other motorized transportation vehicle 53 adapts its planned trajectory 50 or not. In the event of the other motorized transportation vehicle 53 not doing this (perhaps because it is physically impossible), the motorized transportation vehicle 50 has to have an alternative plan, e.g., drive straight ahead. However, since this alternative plan is not communicated to the outside, it can be the case that other motorized transportation vehicles 51, 52, 53 unknowingly thwart this plan.

Figure 4:
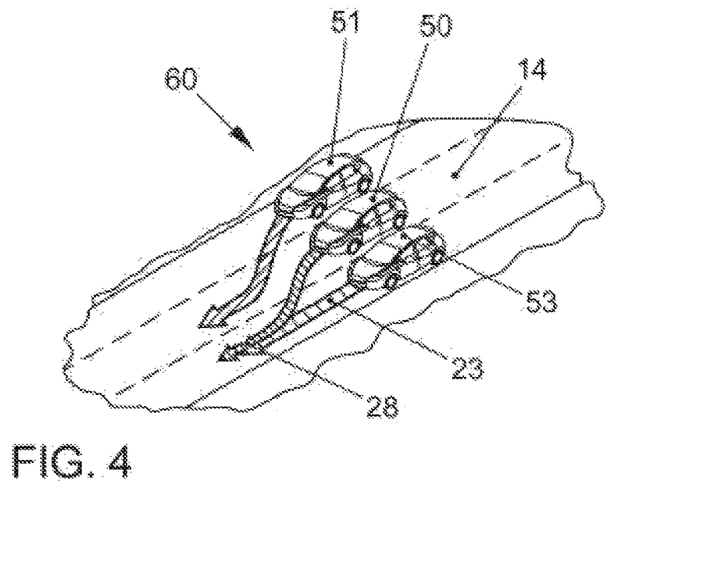
FIG. 4 shows a schematic illustration of a traffic situation explaining the problems which occur during the coordination of driving maneuvers.

FIG. 4 shows such a traffic situation 60 in which another motorized transportation vehicle 51 impedes the alternative of driving on straight ahead in that it changes to the lane 14 of the motorized transportation vehicle 50. The use of merely the planned trajectory is therefore unsuitable for provoking collisions of the trajectories in a targeted state.

In the disclosed embodiments, a desired trajectory is introduced. The desired trajectory is used whenever a motorized transportation vehicle 50, 51 deviates from the normal behavior. The desired trajectory is transferred together with the planned trajectory 20 at regular time intervals to all the other motorized transportation vehicles 51, 52, 53 which are located in the vicinity.

Figure 5:
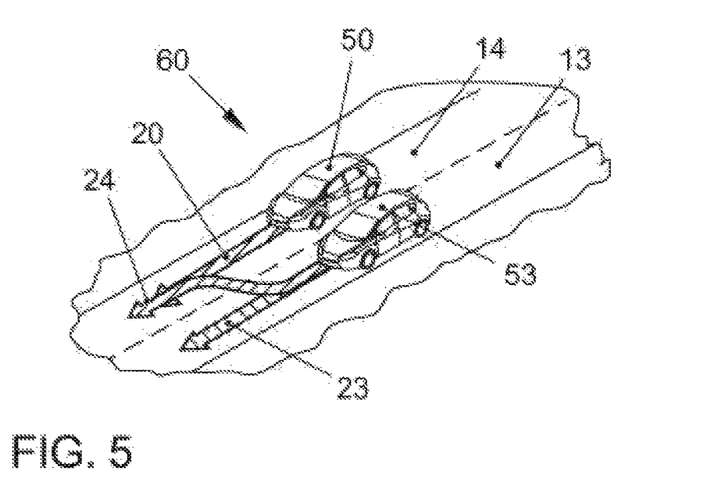
FIG. 5 shows a schematic illustration of a traffic situation explaining the method.

In the traffic situation 60 which is illustrated schematically in FIG. 5, the desire of the other motorized transportation vehicle 53 is to change from the overtaking lane 13 to the lane 14 of the motorized transportation vehicle 50. The planned trajectories 20, 23 of the two motorized transportation vehicles 50, 53 do not deviate from the normal behavior. The other motorized transportation vehicle 53 transfers its planned trajectory 23 and its desired trajectory 24 to the motorized transportation vehicle 50. The motorized transportation vehicle 50 can then assess the situation and evaluate it. If adaptation of the planned trajectory 20 of the motorized transportation vehicle 50 is desired, the adaptation criterion is therefore met and the planned trajectory 20 is adapted. The adapted planned trajectory then no longer collides with the desired trajectory 24 of the other motorized transportation vehicle 53. If, on the other hand, the adaptation is not desired, the adaptation criterion is not met and the planned trajectory 20 of the motorized transportation vehicle 50 is not adapted.

Figure 6:
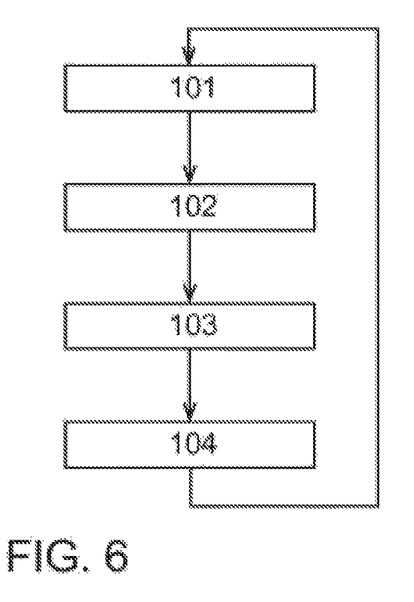
FIG. 6 shows a schematic flowchart of the method.

FIG. 6 shows a schematic flowchart of the disclosed method for the decentralized coordination of driving maneuvers. In a first method operation at 101, a maneuver coordination device receives planned trajectories and desired trajectories from at least one other motorized transportation vehicle via a Vehicle2Vehicle interface. In the next method operation at 102, a maneuver planning device then plans a planned trajectory for the motorized transportation vehicle, which planned trajectory is free of a collision taking into account the planned trajectory of the at least one other motorized transportation vehicle, optionally also the desired trajectory of the at least one other motorized transportation vehicle, and meets predefined safety criteria. In a subsequent method operation at 103, the maneuver planning device plans a desired trajectory for the motorized transportation vehicle, wherein the desired trajectory would be favored over the planned trajectory, but is not necessarily free of collisions with planned trajectories of other motorized transportation vehicles. In the last method operation at 104, the planned trajectories and the desired trajectories are transferred to the maneuver coordination device and are transferred from there to the at least one other motorized transportation vehicle in the area surrounding the motorized transportation vehicle via the Vehicle2Vehicle interface. Subsequently, the method operations at 101, 102, 103, 104 are repeated. In principle, it is also possible to start the method with the method operation at 102 here.

LIST OF REFERENCE NUMBERS

1 Device
2 Maneuver planning device
3 Maneuver coordination device
4 Controller
5 Vehicle2Vehicle interface
13 Overtaking lane
14 Lane
20 Planned trajectory
21 Desired trajectory
22 Strategic trajectory
23 Planned trajectory of the other motorized transportation vehicle
24 Desired trajectory of the other motorized transportation vehicle
25 Normal behavior
26 Basic maneuver
27 Adapted planned trajectory
28 Trajectory
29 Adaptation criterion
30 Total cost function
31 Prioritization
40 Road
50 Motorized transportation vehicle
51 Other motorized transportation vehicle
52 Other motorized transportation vehicle
53 Other motorized transportation vehicle
60 Traffic situation
101-104 Method operations

The invention claimed is:

1. A method for the decentralized coordination of driving maneuvers of at least two motorized transportation vehicles, the method comprising:
providing a planned trajectory and a desired trajectory by a maneuver planning device in a first motorized transportation vehicle;
transferring the planned trajectory and the desired trajectory to at least a second motorized transportation vehicle in the surroundings via a maneuver coordination device of the first motorized transportation vehicle, wherein the maneuver coordination device communicates with the second motorized transportation vehicle via a Vehicle2Vehicle interface;
receiving the planned trajectory and the desired trajectory of the first motorized transportation vehicle by a maneuver coordination device of the second motorized transportation vehicle;
comparing the planned trajectory of the second motorized transportation vehicle with the received desired trajectory of the first motorized transportation vehicle in a maneuver planning device of the second motorized transportation vehicle, and
adapting the planned trajectory of the second motorized transportation vehicle by the maneuver planning device of the second motorized transportation vehicle to form an adapted planned trajectory in response to meeting at least one adaptation criterion,
wherein the planned and desired trajectories of the first motorized transportation vehicle are combined with a strategic trajectory of the first motorized transportation vehicle, and the planned trajectory and a desired trajectory of the second motorized transportation vehicle are combined with a strategic trajectory of the second motorized transportation vehicle,
wherein the planned trajectories of the first and second motorized transportation vehicles are free of collisions with one another, and
wherein the adaptation criterion is that the received desired trajectory of the first motorized transportation vehicle collides with the planned trajectory of the second motorized transportation vehicle, and a total cost function is optimized by the adaptation, wherein the total cost function comprises at least cost functions of the first and second motorized transportation vehicles.

2. The method of claim 1, wherein the adapted planned trajectory is transferred to the maneuver coordination device of the first motorized transportation vehicle by the maneuver coordination device of the second motorized transportation vehicle after the adaptation of the planned trajectory of the second motorized transportation vehicle, and the planned trajectory of the first motorized transportation vehicle is replaced with the desired trajectory of the first motorized transportation vehicle by the maneuver planning device of the first motorized transportation vehicle.

3. The method of claim 1, wherein the optimization of the total cost function comprises a comparison of costs for the execution of the planned trajectories of the first and second motorized transportation vehicles with costs for the execution of the desired trajectory of the first motorized transportation vehicle and for the execution of the adapted planned trajectory of the second motorized transportation vehicle.

4. The method of claim 1, wherein a normal behavior and at least one basic maneuver are carried out by the maneuver planning devices of the at least two motorized transportation vehicles in order to ensure the freedom from collision of the planned trajectories.

5. The method of claim 1, wherein the desired trajectories of the at least two motorized transportation vehicles have a prioritization, with the result that a ranking of the desired trajectories are produced, wherein the ranking determines which of the desired trajectories is implemented.

6. The method of claim 1, wherein the desired trajectories of the at least two motorized transportation vehicles are free of collision.

7. The method of claim 1, wherein the planned trajectory and the desired trajectory of the first motorized transportation vehicle are transferred by the maneuver coordination device only to other motorized transportation vehicles in a predefined area surrounding the first motorized transportation vehicle.

8. The method of claim 1, wherein the maneuver coordination device produces an estimation of the planned trajectory of the other motorized transportation vehicle for another motorized transportation vehicle for which no planned trajectory and/or desired trajectory are available.

9. The method of claim 1, wherein the planned trajectory and the desired trajectory of the first motorized transportation vehicle are transferred to the second motorized transportation vehicle and/or to another motorized transportation vehicle by the maneuver coordination device at regular time intervals and/or when the planned trajectory and/or desired trajectory is changed.

10. A device in a first motorized transportation vehicle for the decentralized coordination of driving maneuvers with at least a second motorized transportation vehicle, the device comprising:
a maneuver coordination device for coordinating driving maneuvers with the second motorized transportation vehicle in the area surrounding the first motorized transportation vehicle, wherein the maneuver coordination device is equipped with a Vehicle2Vehicle interface to communicate with the second motorized transportation vehicle, and a maneuver planning device for providing a planned trajectory and a desired trajectory of the first motorized transportation vehicle,
wherein the maneuver coordination device transfers the provided planned trajectory and the provided desired trajectory of the first motorized transportation vehicle at least to the second motorized transportation vehicle, and receives planned trajectories and desired trajectories which are transferred by the second motorized transportation vehicle, and
wherein the maneuver planning device adapts the planned trajectory of the first motorized transportation vehicle as a function of the received desired trajectory of the second motorized transportation vehicle to form an adapted planned trajectory given the presence of an adaptation criterion,
wherein the planned trajectories and desired trajectories of the first motorized transportation vehicle are combined with a strategic trajectory of the first motorized transportation vehicle,
wherein the planned trajectories of the first and second motorized transportation vehicles are free of collision with one another, and
wherein the adaptation criterion is that the received desired trajectory of the second motorized transportation vehicle collides with the planned trajectory of the first motorized transportation vehicle, and a total cost function is optimized by the adaptation, wherein the total cost function comprises at least cost functions of the first and second motorized transportation vehicles.

* * * * *